US012787921B2

(12) United States Patent
Costa Kassis

(10) Patent No.: US 12,787,921 B2
(45) Date of Patent: Nov. 10, 2026

(54) ADJUSTABLE AGRICULTURAL MACHINE

(71) Applicant: Hosam Costa Kassis, Meilya Village (IL)

(72) Inventor: Hosam Costa Kassis, Meilya Village (IL)

( * ) Notice: Subject to any disclaimer, the term of this patent is extended or adjusted under 35 U.S.C. 154(b) by 608 days.

(21) Appl. No.: 18/360,017

(22) Filed: Jul. 27, 2023

(65) Prior Publication Data

US 2025/0031615 A1 Jan. 30, 2025

(51) Int. Cl.
*A01D 34/74* (2006.01)
*A01D 34/685* (2006.01)
*A01D 47/00* (2006.01)
*A01D 101/00* (2006.01)

(52) U.S. Cl.
CPC ........... *A01D 34/74* (2013.01); *A01D 34/685* (2013.01); *A01D 47/00* (2013.01); *A01D 2101/00* (2013.01)

(58) Field of Classification Search
CPC ...... A01D 34/74; A01D 34/685; A01D 47/00; A01D 2101/00
See application file for complete search history.

(56) References Cited

U.S. PATENT DOCUMENTS 3,264,807 A 8/1966 Wallace
4,370,846 A 2/1983 Arnold
5,321,938 A * 6/1994 LeBlanc .............. A01D 34/661 56/14.7
5,771,669 A * 6/1998 Langworthy ........ A01D 75/306 56/15.8
7,065,947 B1 6/2006 Street et al.
2009/0293439 A1* 12/2009 Phillips ................ A01D 75/306 56/7
2012/0266580 A1* 10/2012 Ulmefors ............. A01D 34/863 56/15.9
(Continued)

FOREIGN PATENT DOCUMENTS

CN 107046923 A 8/2017
CN 108925211 A * 12/2018 ............. A01D 34/40
(Continued)

OTHER PUBLICATIONS

International Search Report from International Application No. PCT/IL2024/050719 Oct. 10, 2024, 13 pgs.

*Primary Examiner* — Nicole Coy
*Assistant Examiner* — Jennifer A Railey
(74) *Attorney, Agent, or Firm* — Tutunjian & Bitetto, P.C.

(57) ABSTRACT

A device configured to be connected to a machine that is movable over a ground surface, the device comprising: a variable bridge, said variable bridge defining an elongated axis, wherein said variable bridge is movable, in a translation movement, in a vertical axis and is movable in a rotational movement around the vertical axis, the vertical axis is orthogonal to the elongated axis, said variable bridge comprising a core segment and two extension segments, each of said two extension segments is connected to said core segment at an end of said core segment by a joint enabling rotation movement of a corresponding extension segment; two moveable heads mounted on said variable bridge, each of which is mounted on a different extension segment. The device is configured to be permanently attached to said machine, or attachable to and detachable from said machine.

20 Claims, 9 Drawing Sheets

(56) References Cited

U.S. PATENT DOCUMENTS

| | | | | |
|---|---|---|---|---|
| 2016/0014959 | A1 | 1/2016 | Atsumi | |
| 2016/0353658 | A1 | 12/2016 | Woodrum | |
| 2017/0006760 | A1 * | 1/2017 | Nielsen | A01D 34/74 |

FOREIGN PATENT DOCUMENTS

| | | | |
|---|---|---|---|
| CN | 201810729484 | A * | 12/2018 |
| DE | 202010008743 | U1 | 12/2010 |
| EP | 3180975 | A1 | 6/2017 |
| FR | 2329140 | A7 | 5/1977 |

* cited by examiner

ADJUSTABLE AGRICULTURAL MACHINE

TECHNICAL FIELD

The present disclosure relates to agricultural machines in general, and to automatically adjustable agricultural machine in particular.

BACKGROUND

Agricultural machines are mechanical structures, tools and devices used in farming, gardening or other agriculture. There are many types of agricultural machines, including hand tools, power tools, tractors, farm implement, and the like. Agricultural machines may vary from conventional motorized machinery to fully automatic or robotic machines involving automation technologies, that include advanced digital equipment and robotics.

One example of a commonly used agricultural machine is a lawn or grass mower. Grass mower is a machine that is used to cut grass in a garden or lawn. It is designed to efficiently and effectively trim the grass to a desired length. Grass mowers can be powered by gasoline, electricity, or even manually (by pushing the mower). Grass mowers can come in various types and sizes, ranging from small electric models suitable for small yards to large gas-powered models used for commercial landscaping.

Grass mowers are an important tool for maintaining the health and appearance of a lawn, and can help to prevent overgrowth and weed growth. Regular mowing can also encourage thicker and healthier grass growth, making the lawn look lusher and more vibrant.

BRIEF SUMMARY

One exemplary embodiment of the disclosed subject matter is a device configured to be connected to a machine that is movable over a ground surface, the device comprising: a variable bridge, said variable bridge defining an elongated axis, wherein said variable bridge is movable, in a translation movement, in a vertical axis and is movable in a rotational movement around the vertical axis, the vertical axis is orthogonal to the elongated axis, said variable bridge comprising a core segment and two extension segments, each of said two extension segments is connected to said core segment at an end of said core segment by a joint enabling rotation movement of a corresponding extension segment; two moveable heads mounted on said variable bridge, each of which is mounted on a different extension segment.

Optionally, the device is permanently attached to said machine.

Optionally, the device is attachable to and detachable from said machine.

Optionally, each moveable head of said two moveable heads comprising a separate motor that is configured to be activated separately and independently from each other, whereby enabling different speeds and movement directions of internal components of each moveable head.

Optionally, said joint enables a rotation movement around at least the vertical axis and a depth axis, wherein the depth axis is orthogonal to both the elongated axis and the vertical axis.

Optionally, said joint further enables a rotation movement around the elongated axis.

Optionally, said joint is at least one of: a universal joint, a ball joint, and a Clevis joint.

Optionally, said joint comprises a first joint component and a second joint component, wherein the first joint component enables a rotation movement around the vertical axis, and wherein the second joint component enables a rotation movement around a depth axis, wherein the depth axis is orthogonal to both the elongated axis and the vertical axis.

Optionally, said variable bridge is configured to modify a relative distance between said two moveable heads, thereby reducing or increasing a distance between effective action areas defined by each moveable head of said two moveable heads.

Optionally, said variable bridge is further configured to be extended and diminished telescopically to control a width thereof, thereby modifying the relative distance between said two moveable heads.

Optionally, the device further comprises: a plurality of dynamically mounted moveable heads configured to be mounted on said variable bridge, covering the entire width of said variable bridge, wherein a number of the plurality of dynamically mounted moveable heads is determined based on a current width of said variable bridge; wherein each dynamic moveable head is detachable from said variable.

Optionally, each extension segment is movable in movable in 3 axes translation movement, whereby said moveable head mounted on said extension segment is capable of being folded, directed and tilted to any angle with respect to the ground of surface.

Optionally, each extension segment is capable of performing a rolling movement around their axis, enabling said moveable head to be angled upwards.

Optionally, said two moveable heads differentiates in at least one of a type of the moveable head, a size of the moveable head, a shape of the moveable head, and the action performed by the moveable head.

Optionally, the device is configured to be controlled by a control unit, said control unit is configured to control the width and movement of said variable bridge, said control unit is further configured to control movement of said two moveable heads and the distance therebetween.

Optionally, the device comprises said control unit.

Optionally, said control unit is configured to: obtain sensor readings from one or more sensors monitoring an area in which said machine operates; and automatically modify parameters of said variable bridge based on the sensor readings.

Optionally, the parameters comprise at least one of: a height of said variable bridge from the ground surface; a width of said variable bridge; a direction of movement of said variable bridge; a speed of movement of said variable bridge; a number of activated moveable heads mounted on said variable bridge; a type of each activated moveable head mounted on said variable bridge; a size and shape of each activated moveable head mounted on said variable bridge; and movement parameters of each activated moveable head.

Optionally, the device further comprising: a lifting/lowering mechanism configured to automatically control a height of said variable bridge based on features of the ground surface.

Optionally, the machine is a lawn mower; wherein said two moveable heads are two mowing heads, each of which includes one or more revolving blades that are configured to rotate around an axis that is orthogonal to the elongated axis.

Optionally, said two mowing heads are differentiate from one another in at least one of: a number of said one or more revolving blades; and a type of said one or more revolving blades.

Optionally, said machine is an agricultural machine, such as but not limited to a lawn mower.

Optionally, said two moveable heads are selected from a group consisting of: a mowing head; a brush; a plough head; a vacuum cleaning head; and a tilting head.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
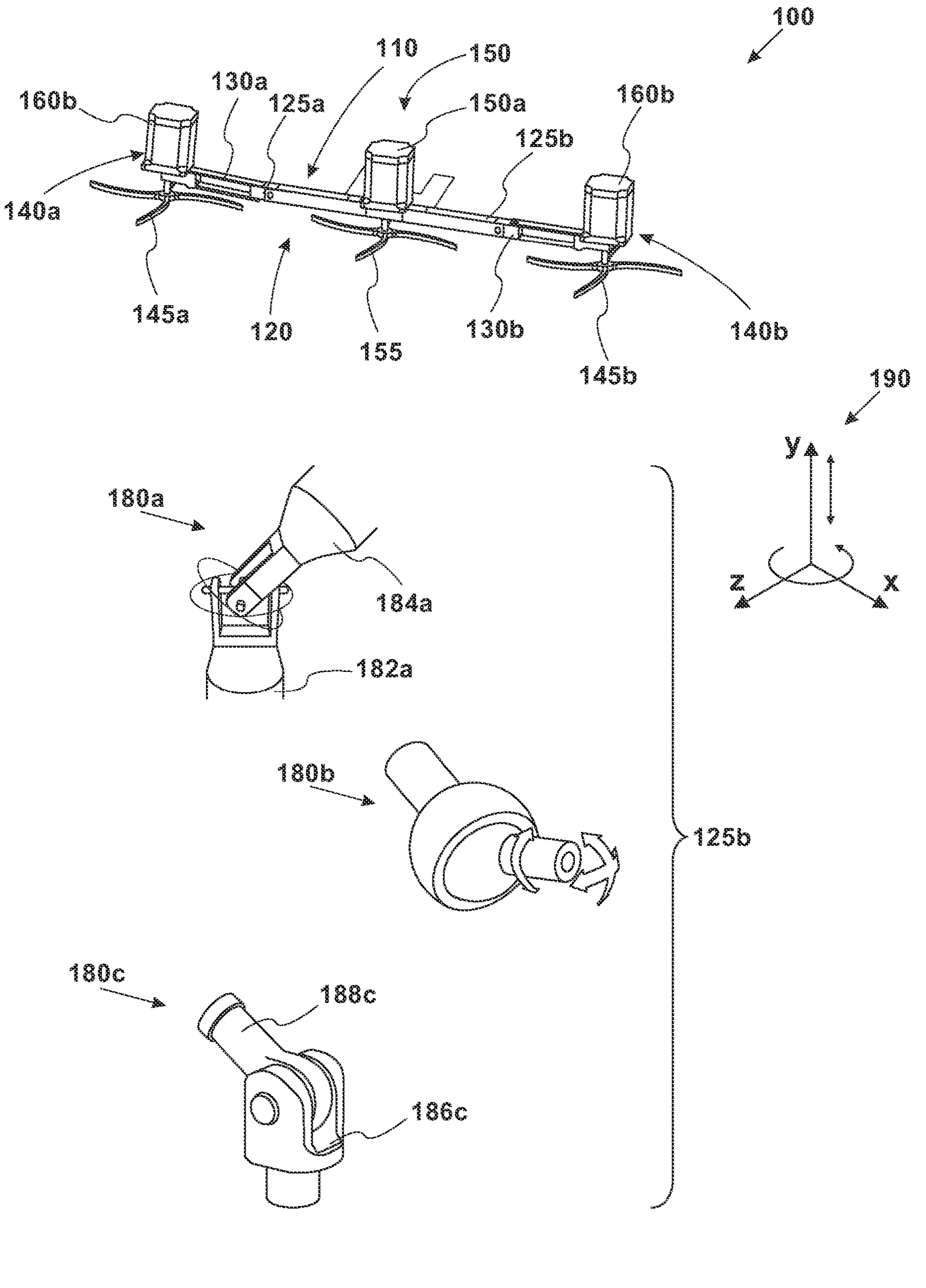
FIG. 1 shows an exemplary illustration of a mowing device, in accordance with some exemplary embodiments of the subject matter.

One technical problem dealt with by the disclosed subject matter is to provide a faster, easier, and more efficient agricultural action such as lawn mowing process. Conventional agricultural machines, such as for example, conventional lawn mowers are very slow, and operate in one direction and thin paths. Such machines require great effort from the operator to control the action area and direction. Larger devices, which are intended for operating in large areas, require a special operating (driving) license, special skills, or the like. In some exemplary embodiments, a mower (also referred to as a lawn mower, a grass cutter, or a grass mower) may be a device utilizing one or more revolving blades, reels, or other cutting means, to cut a grass surface to an even height. The height of the cut grass may be fixed by the design of the mower, may be adjustable by the operator of the mower, may be set based on user input, or the like. Several types of mowers may be utilized, each suited to a particular scale and purpose. The smallest types, non-powered push mowers, may be suitable for small residential lawns and gardens. Electrical or piston engine-powered push-mowers may be used for larger residential lawns. Riding mowers may be larger than push mowers and may be suitable for large lawns.

Mowing large lawns and other ground surfaces can be a time-consuming and challenging task. Conventional lawn mowers typically comprise a deck and a single mowing head, and therefore, require multiple passes over the same area to achieve an even cut. Furthermore, conventional lawn mowers often have difficulty accessing confined areas and uneven terrain. Therefore, there is a need for a device for use with a lawn mower that overcomes the limitations of conventional devices and provides improved mowing efficiency and effectiveness. Similar technical problems and limitations arise with other agricultural instruments and farming tools, such as tools for raking, plowing, or the like.

One technical solution is an adjustable device that can be connected to any type of agricultural machine, which may be movable over the ground or surface. In some exemplary embodiments, the device that may be configured to be attached to and detached from existing agricultural machines, may be a dynamic component designed for particular mowers, may be permanently attached to a lawn mower, be integrally formed with a lawn mower, or the like.

It may be noted that the adjustable device may be adapted to be attached to other machines, such as farming machines or machine utilized for agricultural purposes, or machines with other functionalities, such as tractors, harvesters, cultivator, spreaders, or the like.

In some exemplary embodiments, the device may comprise a variable bridge defining an elongated axis. The variable bridge may be movable in a translation movement in a vertical axis that is orthogonal to the elongated axis and in a rotational movement around the vertical axis. The variable bridge may comprise a core segment and two extension segments connected to the end of the core segment by a joint enabling rotation movement of a corresponding extension segment. In some exemplary embodiments, the joint may be configured to enable a rotation movement around at least the vertical axis and a depth axis, that is orthogonal to both the elongated axis and the vertical axis. Additionally, or alternatively, the joint may be further configured to enable a rotation movement around the elongated axis. Additionally, or alternatively, the bridge may be configured to move in a second rotation axis to enable horizontal rotary movement to create convenient access to confined areas.

In some exemplary embodiments, two or more moveable heads may be mounted on the variable bridge. In the following section, an example of mowing heads is utilized. It may be noted that in other embodiments, the adjustable device may be utilized for other purposes, and may be attachable to other types of machines having functionalities other than mowing or cutting vegetation, or non-agricultural functionalities. In such embodiments, other types of heads may be mounted on the variable bridge, in accordance with the required functionality. As an example, plowing heads may be utilized for plowing machines, harvesting heads may be utilized in harvesters, or the like. Additionally or alternatively, heads with other functionalities may be mounted on the variable bridge, instead of or in addition to the mowing heads to provide additional functionalities for the mowing device or to diversify the use of the device beyond its primary purpose as a mowing device, such as vacuum cleaning heads, plowing heads, or the like.

In some exemplary embodiments, the two or more mowing heads may be mounted on the variable bridge, a least one on each extension segment. Each mowing head may comprise one or more revolving blades that are configured to rotate around an axis that is orthogonal to the elongated axis. The one or more revolving blades may be placed on a spindle and located under the variable bridge, facing down the mowing surface. The spindle may be designed to support the one or more revolving blades and protect the user from any debris that is thrown up during operation. In some exemplary embodiments, each mowing head may be activated using a separate motor, separately and independently from other mowing heads. Each motor may be configured to provide power to the revolving blades, enabling a rotation thereof at high speed, or the like. Different speeds and movement directions of the one or more revolving blades of each mowing head may be enabled simultaneously and independently from other active mowing heads, in accordance with the ground surface adjacent to the mowing head. Additionally or alternatively, only a portion of the mowing heads may be activated, such as by shutting down motors of the other mowing heads. This may be performed in order to save energy, allocating available power to the motors activating mowing heads acting in more essential locations, or the like.

In some exemplary embodiments, different mowing heads may comprise different styles or types of blades. As an example, rotary mowing heads may employ a single blade that rotates about a single vertical axis. As another example, cylinder or reel mowing heads may be designed to employ a cutting bar or multiple blade assembly that is configured to rotate about a single horizontal axis. Other types of mowing heads may be designed to employ one or more blades, with a rotating assembly consisting of flat metal pieces which force the blades of grass against the sharp cutting bar.

In some exemplary embodiments, the lawn mower on which the device is attached may be powered by manual force, with the device mechanically connected thereto so that when the lawn mower is pushed forward, the mowing heads may spin. Additionally, or alternatively, the lawn mower or the device may have a battery-powered, plug-in electric motor, or the like, configured to supply power for the movement of the lawn mower, the movement of the device, the movement of the variable bridge, or the like. It may be noted that the disclosed device may be attachable to any type of lawn mower, such as manually pushed mowers, electrically powered mowers, automatic mowers, semi-automatic mowers, or the like. As an example, the device may be attachable to a common self-contained power source lawn mower, such as a small (typically one-cylinder) internal combustion engine. Smaller mowers may often lack any form of propulsion, requiring human power to move over a surface. Accordingly, the device may be provided with its own power source, may be powered by the mechanic force of human power, or the like. As another example, the device may be attachable to "walk-behind" mowers that may be self-propelled, requiring a human only to walk behind and guide them. As yet another example, the device may be attachable to larger lawn mowers that may usually either be self-propelled "walk-behind" types or more often, may be "ride-on" mowers, equipped so the operator can ride on the mower and control it. Additionally, or alternatively, the device may be attachable to a robotic lawn mower (also referred to as a lawn-mowing bot), designed to operate either entirely on its own (autonomous lawn-mowing bot), by an operator by remote control, using a computerized device, a designated mobile application, or the like.

In some exemplary embodiments, the extension segments may be movable in 3 axes translation movement, capable of being folded, enabling the mowing head mounted thereon to be directed, tilted to any mowing angle, or the like. Additionally, or alternatively, each extension segment may be capable of performing a rolling movement around its axis, enabling the mowing head mounted thereon to be angled upwards. In some cases, the extension segments may be moved so as to adjust the mowing heads to the conditions of the terrain. Additionally, or alternatively, the extension segments may be moved so as to ensure the mowing heads do not operate on the terrain, and that they do not create a limitation on the mowing path. For example, the extensions may be folded so as to avoid enlarging the width or length of the lawn mower.

In some exemplary embodiments, the variable bridge may be configured to modify the relative distance between the mowing heads, e.g., reduce or increase the distance between effective mowing areas defined by each mowing head of the mowing heads. Additionally, or alternatively, the variable bridge may be further configured to be extended and diminished telescopically to control the width thereof and modify the relative distance between the mowing heads.

Additionally, or alternatively, a plurality of dynamic mowing heads may be configured to be mounted on the variable bridge, covering the entire width thereof. Each dynamic mowing head may be automatically detachable from the variable bridge based on the current width of the variable bridge. Different mowing heads may differ in the size of the mowing head, the shape of the mowing head, the cutting mechanism, the number of revolving blades, the type of revolving blades, or the like.

In some exemplary embodiments, the device may be configured to be controlled by a control unit. The control unit may be configured to control the width and movement of the variable bridge. The control unit may further be configured to control the movement of the mowing heads and the distance therebetween. Additionally, or alternatively, the control unit may be configured to automatically modify the mowing parameters of the variable bridge based on sensor readings obtained from one or more sensors monitoring the mowing area in which the lawn mower operates, such as the height of the variable bridge from the ground surface, a width of the variable bridge, a direction of movement of the variable bridge, a speed of movement of the variable bridge, the number of activated mowing heads mounted on the variable bridge, size and shape of each activated mowing head mounted on the variable bridge; movement parameters of each activated mowing head, or the like. In some cases, the control unit may be instructed by the user, such as using a user interface for controlling the device.

Additionally, or alternatively, the device may comprise a lifting/lowering mechanism configured to control (automatically or manually) the height of the variable bridge based on features of the ground surface. It may be noted that the width of the variable bridge may be wider than the wheelbase of the lawn mower. The extended ends of the variable bridge may be utilized to level a road for the wheels and the mowing heads on the ground surface. The wheels of the lawn mower may allow it to move around the lawn while the mowing heads are spinning. The height of each mowing head may be adjusted, in order to cut the grass to a desired length.

One technical effect of the disclosed subject may be providing a faster, easier, and more efficient lawn mowing process. The vertical and rotational movement of the variable bridge of the device, and the movement of the mowing heads, may enable 6 degrees of freedom in the mowing process, enabling it to reach every desired lawn area.

Another technical effect of the disclosed subject may be providing efficient use of existing lawn mowers, overcoming limitations thereof, and providing improved mowing efficiency and effectiveness. The use of the disclosed adjustable device that can be attached to lawn mowers enables modifying a range of movement and operation of conventional lawn mowers that operate in one direction and thin mowing paths.

Yet another technical effect of the disclosed subject may be providing an accurate automated adaptation of the mowing process to the parameters of the surface at each mowing spot. The ability to provide different speeds and movement directions of different mowing heads in different locations over the variable bridge may enable an adapted and accurate mowing process for each mowing area simultaneously and independently by each mowing head. The adjustable mowing heads enable mowing uneven terrain efficiently, without leaving behind uncut patches of grass or vegetation. Furthermore, the present invention enables a wider mowing width and reduces the need for multiple passes over the same area. Furthermore, the variable bridge is movable in translation and rotational movement, enabling easier access to confined areas and uneven terrain.

The disclosed subject matter may provide for one or more technical improvements over any pre-existing technique and any technique that has previously become routine or conventional in the art. Additional technical problems, solutions, and effects may be apparent to a person of ordinary skill in the art in view of the present disclosure.

Referring now to FIG. 1 showing an exemplary illustration of a mowing device, in accordance with some exemplary embodiments of the subject matter.

In some exemplary embodiments, Device 100 may be a mowing device designed to be attached to a lawn mower (such as in FIGS. 2A-2C, 3A-3D) that is movable over a ground surface.

In some exemplary embodiments, Device 100 may comprise a Variable Bridge 110 defining an elongated axis. Variable Bridge 110 may be movable in a translation movement, in a vertical axis (i.e., y-axis), that is orthogonal to the elongated axis of Variable Bridge 110 (i.e., x-axis or the axis parallel to the surface of the ground), such that Variable Bridge 110 being capable of shifting up and down (e.g., vertical shift) parallel to the surface of the ground, parallel to the mowing machine bottom, parallel to the main mowing area, or the like. Additionally, or alternatively, Variable Bridge 110 may be movable in a rotational movement around the vertical axis (i.e., y-axis). It may be noted that the translation and the rotational movements may be achieved independently. Additionally, or alternatively, the translation and the rotational movements may be achieved simultaneously, around the same axis.

In some exemplary embodiments, the translation and the rotational movements of Variable Bridge 110 may be achieved using a combination of linear and rotary actuators. A linear actuator may be utilized to control the translation movement of Variable Bridge 110 on a vertical axis. The linear actuator may be attached to the base of Variable Bridge 110, such as at the middle of Variable Bridge 110, below Core Segment 120, or the like. The linear actuator may be configured to apply a force in the upward or downward direction as required to move the entirety of Variable Bridge 110 in the desired direction along the vertical axis.

Figure 2A:
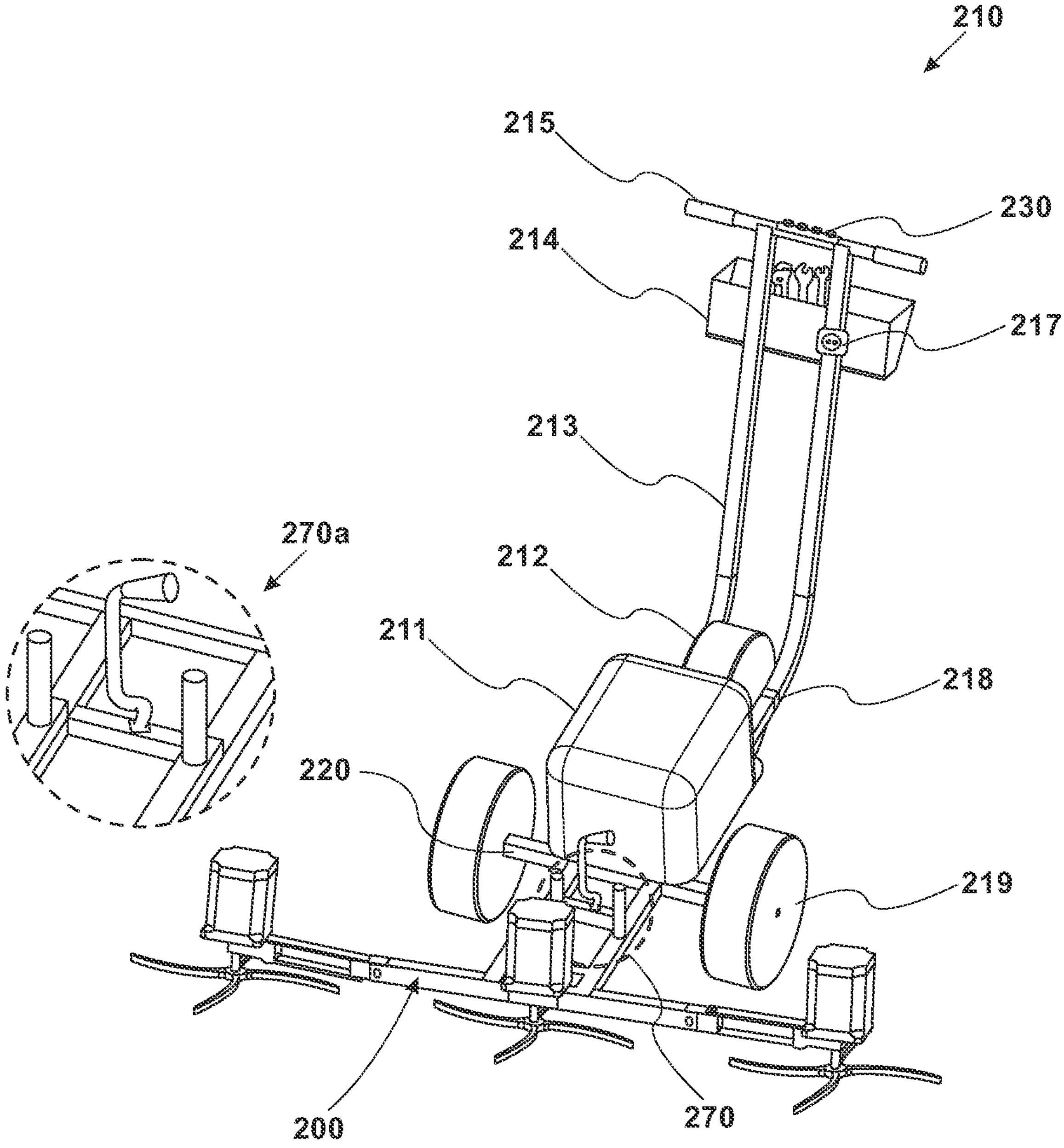
FIGS. 2A-2C show exemplary illustrations of devices attached to lawn mowers, in accordance with some exemplary embodiments of the subject matter.

In some exemplary embodiments, the linear actuator may be controlled manually, such as using a manual mechanism as shown in element 270*a* in FIG. 2A. Additionally, or alternatively, the linear actuator may be controlled automatically, based on sensor readings, conditions of the mowing area, or the like. Additionally, or alternatively, the linear actuator may be controlled mechanically, using Control Unit 230, or the like. Additionally, or alternatively, the linear actuator may be controlled based on user input, such as a predetermined distance from the ground surface, a desired grass height, or the like. In some exemplary embodiments, a rotary actuator may be utilized to control the rotation of Variable Bridge 110 around the vertical axis. The rotary actuator may be attached to the base of Variable Bridge 110 to apply torque to rotate Variable Bridge 110 around the vertical axis. It may be noted that the vertical axis is required to be orthogonal to the elongated axis. Accordingly, it may be required to ensure that the axis of rotation of the rotary actuator is perpendicular to the elongated axis of Variable Bridge 110. This can be accomplished by mounting the rotary actuator on a bracket that is oriented perpendicular to the elongated axis of Variable Bridge 110. Additionally, or alternatively, other designs or mechanisms that enable the translation and the rotational movement of Variable Bridge 110 may be utilized.

In some exemplary embodiments, Variable Bridge 110 may comprise a Core Segment 120 and two Extension Segments 130*a* and 130*b*. Each of Extension Segments 130*a* and 130*b* may be connected to Core Segment 120 at an end thereof by a Joint 125*a* and 125*b*, respectively, enabling rotation movement of corresponding Extension Segments 130*a* and 130*b*. It may be noted that the rotation movement of Extension Segments 130*a* and 130*b* is independent of the rotational movement of Variable Bridge 110 and may be achieved and controlled in a different independent mechanism than the rotational movement of Variable Bridge 110. In some exemplary embodiments, each of Extension Segments 130*a* and 130*b* may be movable in 3 axes translation movement, capable of performing a rolling movement around their axis, or the like.

In some exemplary embodiments, Joints 125*a* and 125*b* may be universal joints, such as Joint 180*a* (also referred to as "U-joint"). Joint 180*a* may be designed to connect the respective extension segment with Core Segment 120 in a manner enabling inclining the extension segment to any angle with respect to Core Segment 120. Joint 180*a* may be utilized to transmit the rotary motion of the extension segment. In some exemplary embodiments, Joint 180*a* may consist of a pair of hinges (a first Joint Component 182*a* and a second Joint Component 184*a*) located close together, oriented at 90° to each other, connected by a cross shaft, or the like. First Joint Component 182*a* may be configured to enable a rotation movement around the vertical axis. Second Joint Component 184*a* be configured to enable a rotation movement around a depth axis that is orthogonal to both the elongated axis and the vertical axis.

Additionally, or alternatively, Joints 125*a* and 125*b* may be ball joints, such as Joint 180*b*. Joint 180 *b* may be configured to connect the respective extension segment with Core Segment 120 in a manner allowing rotational movement of the extension segments in all directions. Joint 180*b* may be configured to enable a free rotation of the extension segments in two planes at the same time while preventing translation in any direction, including rotating in those planes. Additionally, or alternatively, Joints 125*a* and 125*b* may be Clevis joint, such as Joint 180*c*, designed to connect the respective extension segment with Core Segment 120 in a manner allowing a 3-D range of motion. Joint 180*c* may consist of a Clevis Part 186*c*, which may be a U-shaped piece of metal with two holes for pins, and a Pin 188*c*, which may be a cylindrical pin designed to fit through the holes in the clevis. Joint 180*c* may be configured to connect Core Segment 120 by being inserted into the U-shaped opening of Clevis Part 186*c*, and inserting Pin 188*c* through the holes in Clevis Part 186*c* and the respective extension segment. Once the clevis joint is assembled, the Core Segment 120 and the respective extension segment may be enabled to move in a range of motion around the axis of Pin 188*c*. This allows for flexibility in Joints 125*a* and 125*b*, making it useful for applications where movement is required, such as in angled surfaces as depicted in FIGS. 3A-3D.

Additionally, or alternatively, Joints 125*a* and 125*b* may be of any type enabling 3 axes translation movement of extension segments, a rolling movement, a 360° movement, a rotational movement, or the like, such as Double Cardan joint, Thompson coupling, or the like. Additionally, or alternatively, Joints 125*a* and 125*b* may comprise a combination of different types of mechanical joints, such as rod ends or ball joints, to create complex mechanical systems with a high degree of mobility and flexibility.

In some exemplary embodiments, multiple Mowing Heads such as 140*a*, 140*b*, and 150 may be mounted on Variable Bridge 110. Mowing Head 150 may be located at the center of Variable Bridge 110. Mowing Heads 140*a* and 140*b* may be mounted on Extension Segments 130*a* and 130*b*, respectively. It may be noted that due the 3 axes translation movement of Extension Segments 130*a* and 130*b*, each of Mowing Heads 140*a* and 140*b* may be capable of being folded, directed and tilted to any mowing angle. Furthermore, due the rolling movement of Extension Segments 130*a* and 130*b* around their axes, each of Mowing Heads 140*a* and 140*b* may be capable of being angled upwards. Additionally, or alternatively, a plurality of dynamic mowing heads may be configured to be mounted on Variable Bridge 110, covering the entire width of Variable Bridge 110. Each dynamic mowing head may be manually or automatically detachable from Variable Bridge 110 based on a current width of Variable Bridge 110.

In some exemplary embodiments, Mowing Heads 140*a*, 140*b*, and 150 may include one or more revolving Blades 145*a*, 145*b*, and 155, respectively. Each of Blades 145*a*, 145*b*, and 155 may be configured to rotate around an axis that is orthogonal to the current elongated axis of the segment of Variable Bridge 110 the respective mowing head is connected thereto.

In some exemplary embodiments, one or more mowing heads, such as Mowing Head 150, may be permanently attached Variable Bridge 110, such as on to Core Segment 120, accordingly having a fixed elongated axis. Additionally, or alternatively, Extension Segments 130*a* and 130*b* may be enabled, using Joints 125*a* and 125*b*, with a rotation movement around at least the vertical axis (e.g., around y-axis) and a depth axis (i.e., z-axis), that is orthogonal to both the elongated axis (i.e., x-axis) and the vertical axis (i.e., y-axis), as depicted in 190. Additionally, or alternatively, Joints 125*a* and 125*b* may be designed to enable Extension Segments 130*a* and 130*b* with a rotation movement around the elongated axis (i.e., x-axis).

In some exemplary embodiments, each of Mowing Heads 150, 145*a* and 145*b* may comprise a separate Motor (150*a*, 160*a* and 160*b*, respectively) configured to be activated separately and independently from each other. Motors 150*a*, 160*a* and 160*b* may be configured to enable Mowing Heads 150, 145*a* and 145*b* with different speeds and movement directions of Blades 145*a*, 145*b*, and 155. Additionally or alternatively, each combination of Motors 150*a*, 160*a* and 160*b* may be activated based on the planned activity of Mowing Heads 150, 145*a* and 145*b*, in a manner enabling allocating available power between the plurality of motors. As an example, on motor may be deactivated in order to provide more energy to another motor.

Referring now to FIG. 2A showing an exemplary illustration of a device attached to a lawn mower, in accordance with some exemplary embodiments of the subject matter.

In some exemplary embodiments, Device 200 may be similar to Device 100 described in FIG. 1. Device 200 may be permanently attached to a Mower 210. Additionally, or alternatively, Device 200 may be attachable to Mower 210 and detachable from Mower 210, manually, mechanically, semi-automatically, or the like.

In some exemplary embodiments, Mower 210 may comprise a Power Source 211, such as an electrical power source unit, as a battery, an internal combustion engine, a generator, or the like. Power Source 211 may be utilized to supply power for different actions of Mower 210, different components of Mower 210, movement of Mower 210, or the like. Device 200 may be powered by Power Source 211, e.g., by providing electrical power to Motors 150*a*, 160*a*, and 160*b* of Device 200, or any required type of voltage suitable for the type of electric motors of Device 200. Additionally, or alternatively, Device 200 may have a separated power supply, may be operated separately from Mower 210, or the like. In some exemplary embodiments, Power Source 211 may be utilized to supply power for controlling Device 200, such as directly to Control Unit 230, switching Control Unit 230, activating Device 200, shutting down Device 230, overload protection, or the like.

In some exemplary embodiments, Mower 210 may comprise components that are generally or originally designed for the operation of regular mowers, regardless of the operation of Device 200, such as a rear Wheel 212 utilized to balance the chassis of Mower 210, a height-adjusted carrying and towing Arm 213 having a capability of being foldable, elongated (e.g., telescopically), an electrical Outlet 217 for operating a variety of external electrical applications (e.g., a sharpener, a drill, or the like), a Chassis 218 designed to hold components of Mower 210, Device 200, or the like.

Additionally, or alternatively, Mower 210 may comprise other components such as an Operational Box (214) for storing auxiliary equipment (e.g., work tools, mobile devices, or the like), an adapted Handle 215 utilized to grip and drag Mower 210 and control the movement of Device 200, Wheel Base 220 utilized to move Mower 210, or the like. Such components may be adapted for the attachment of Device 200. Additionally, or alternatively, Device 200 may be designed to fit any type of Mower 210 and its general components, such as having an adapted connection system (not shown) to Mower 210, connecting to Power Source 211, Handle 215, Arm 213, or the like. Additionally, or alternatively, Device 200 may be adjustable in accordance with the properties of such components. As an example, the width of Variable Bridge 110 of Device 200 may be wider than Wheel Base 220 of Mower 210. Extension Segments 125*a* and 125, or Mowing Heads 140*a* and 140*b* of Device 200 may be utilized to level a road for the wheels on the ground surface in front of Mower 210. As another example, a Lift 270 (e.g., 270*a* or 270*b*) or any other lifting/lowering mechanism may be added to Mower 210 to enable controlling the height of Variable Bridge 110 based on features of the ground surface.

In some exemplary embodiments, Device 200 may be attached to Mower 210 in front of Wheel Base 220, to avoid crushing the grass by Wheels 219 before the contact between the Blades 145*a*, 145*b*, and 155 with the grass.

Figure 2B:
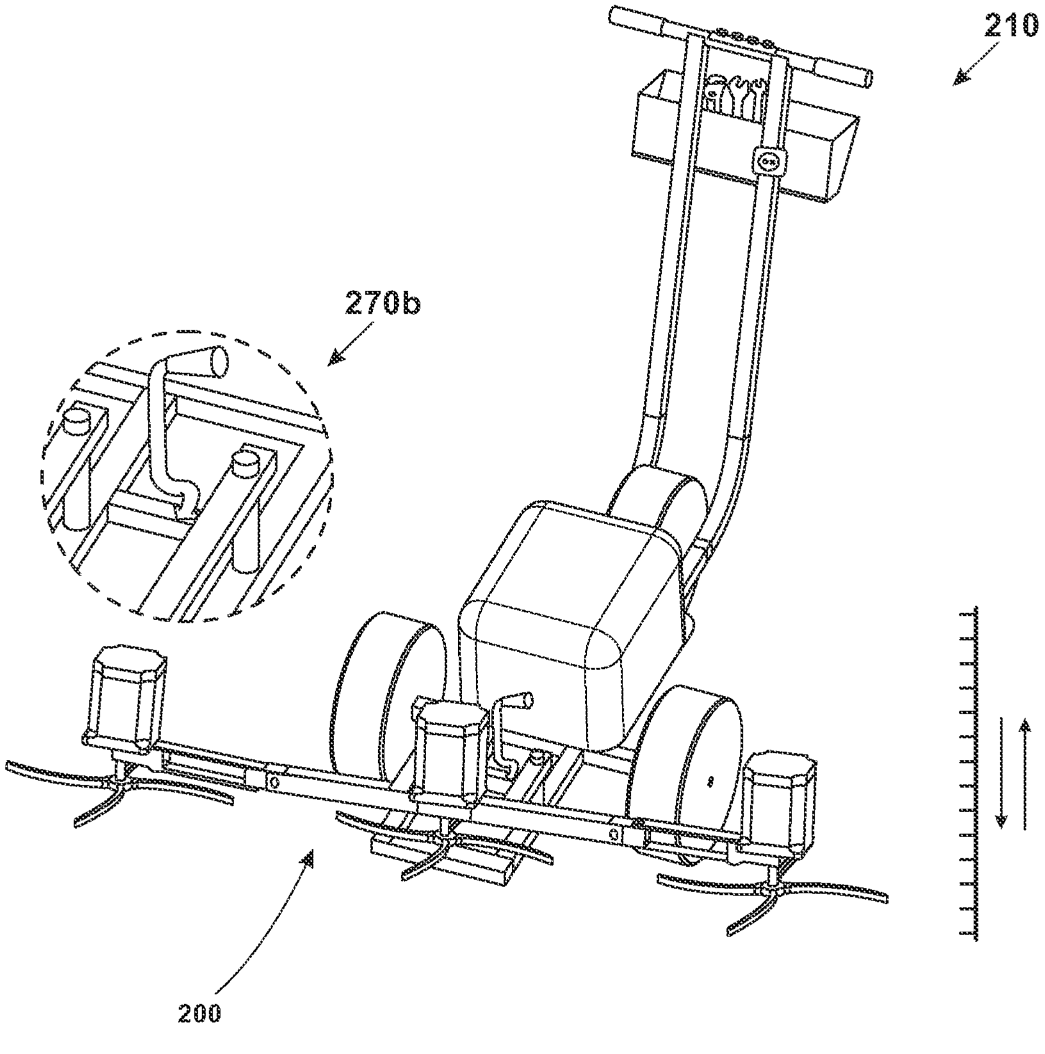
Figure 2C:
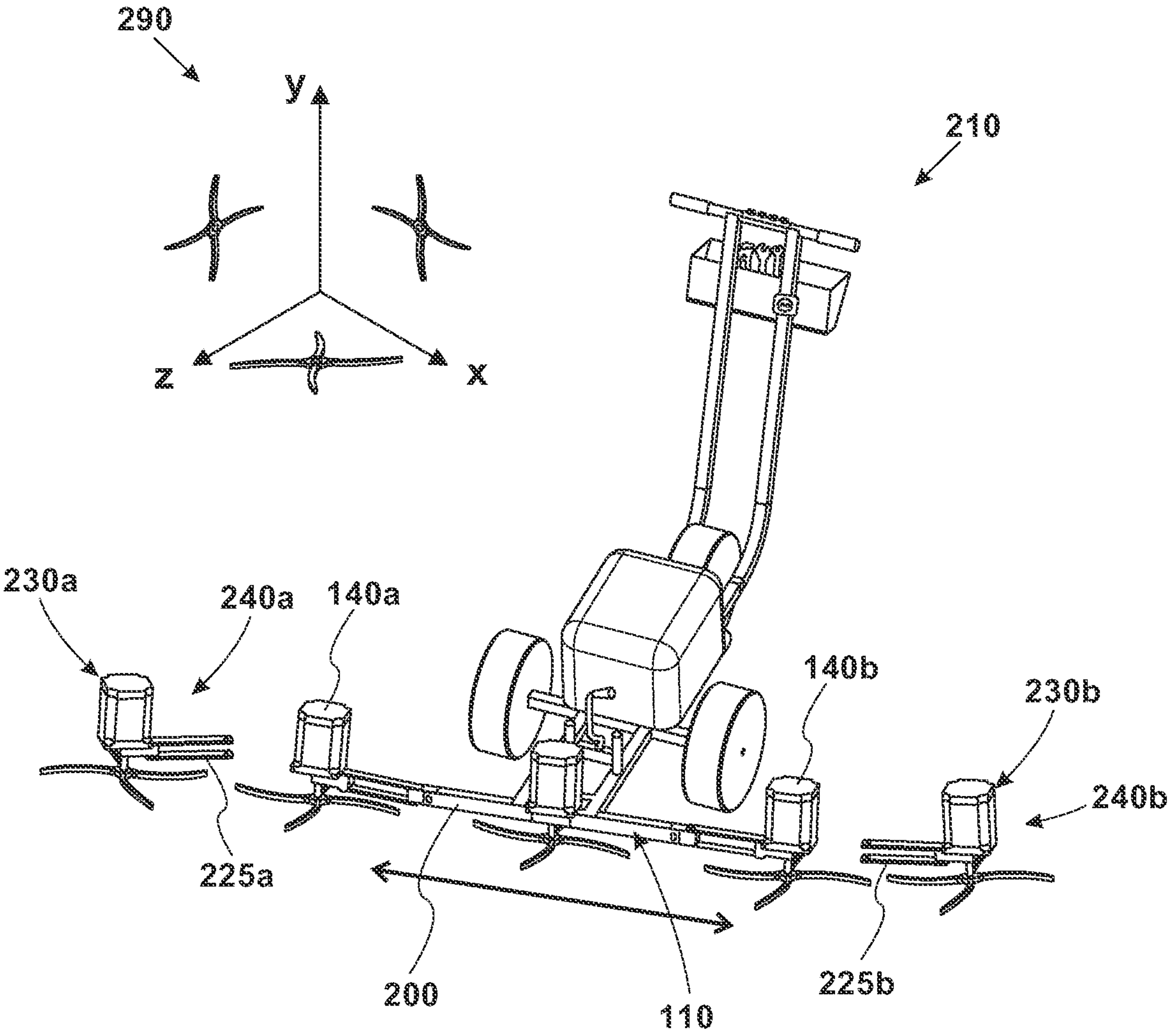

In some exemplary embodiments, Device 200 may be controlled by Control Unit 230. Control Unit 230 may be a component of Mower 210, may be manufactural or manually added to Mower 210, may be attachable to and detachable from Mower 210, may be separated from Mower 210, or the like. Additionally, or alternatively, Control Unit 230 may be comprised by Device 200, a component thereof, or the like. Additionally, or alternatively, Control Unit 230 may be a computational component located on a computing device of the user, may be connected to or controlled by a computing device of the user, or the like. In some exemplary embodiments. Control Unit 230 may be configured to modify (or instruct an operator to modify) a height of Variable Bridge 100, such as depicted in FIG. 2B, a width of Variable Bridge 100, such as depicted in FIG. 2C, or the like. Control Unit 230 may be configured to modify (or instruct an operator to modify) other mowing parameters of Device 200, such as a direction of movement of Variable Bridge 100, the speed of movement Variable Bridge 100, a number of activated mowing heads mounted on Variable Bridge 100, a size and shape of each activated mowing head mounted on Variable Bridge 100, movement parameters of each activated mowing head, increasing/decreasing the power of Motors 150*a*, 160*a* and 160*b*, or the like.

Referring now to FIG. 2B showing an exemplary illustration of a device attached to lawn mowers, in accordance with some exemplary embodiments of the subject matter.

In some exemplary embodiments, Control Unit 230 may be configured to automatically modify the mowing parameters of Variable Bridge 110 of Device 200 while being attached to Mower 210, such as based on the mowing area and mechanically adjusting or instructing to adjust Variable Bridge 110 accordingly. In some exemplary embodiments, the parameters may be automatically updated based on sensor readings of sensors (e.g., cameras) monitoring the mowing area in front of Mower 210, based on user input, a combination thereof, or the like.

In some exemplary embodiments, Control Unit 230 may be configured to adjust a height of Variable Bridge 110 from the ground surface. Control Unit 230 may be configured to instruct Lift 270 to automatically lift (270*b*) or lower (270*a*) Variable Bridge 110 in accordance with parameters of the mowing area, the desired grass height, or the like. Additionally, or alternatively, Control Unit 230 may be configured to instruct an operator of Mower 210 to manually operate Lift 270.

Referring now to FIG. 2C showing an exemplary illustration of a device attached to lawn mowers, in accordance with some exemplary embodiments of the subject matter.

In some exemplary embodiments, Variable Bridge 110 of Device 100 or Device 200 while being attached to Mower 210, may be configured to modify a relative distance between Mowing Heads 140*a* and 140*b*, to reduce or increase the distance between effective mowing areas defined by each mowing head of Mowing Heads 140*a* and 140*b*. Variable Bridge 110 may be configured to be extended and diminished telescopically to control the width thereof, thereby modifying the relative distance between Mowing Heads 140*a* and 140*b*.

Additionally, or alternatively, additional Mowing Heads 240*a* and 240*b* may be added to Variable Bridge 110 to increase the mowing area, such as directly on Variable Bridge 110, by adding additional Extension Segments 230*a* and 230*b* to Variable Bridge 110, or the like.

In some exemplary embodiments, Joints 225*a* and 225 *b* may be utilized to connect additional Extension Segments 230*a* and 230*b* to Variable Bridge 110, by being connected to Extension Segments 130*a* and/or 130*b* in a similar manner of connecting Core Segment 120 to Extension Segments 130*a* and 130*b* by Joints 125*a* and 125*b*. Additionally or alternatively, other types of joints with a restricted movement, may be utilized to connect the additional Extension Segments 130*a* and/or 130*b*, such as joints enabling only translation movement, stable joints, or the like.

Referring now to FIGS. 3A-3D showing exemplary operation of Device 300 in accordance with environments in which Lawn Mower 310 operates, in accordance with some exemplary embodiments of the disclosed subject matter.

Device 300 may be similar to Device 100 depicted in FIG. 1 or Device 200 in FIG. 2. Device 300 may be attachable and detachable from Lawn Mower 310 in a similar manner to attaching Device 200 to Mower 210, having all capabilities, functionalities and moving directions as described in FIGS. 2A-2C.

Figure 3A:
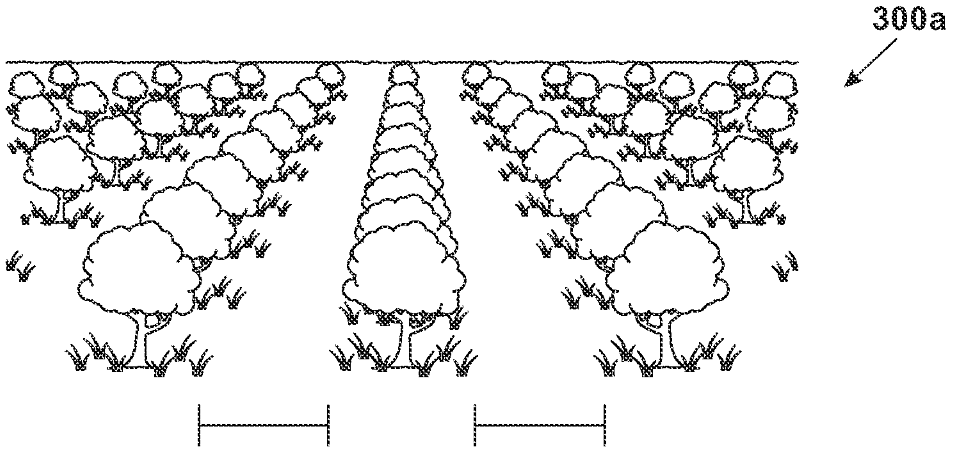
FIGS. 3A-3D show exemplary operation of the devices in accordance with environments in which the lawn mower operates, in accordance with some exemplary embodiments of the disclosed subject matter.
Figure 3A:
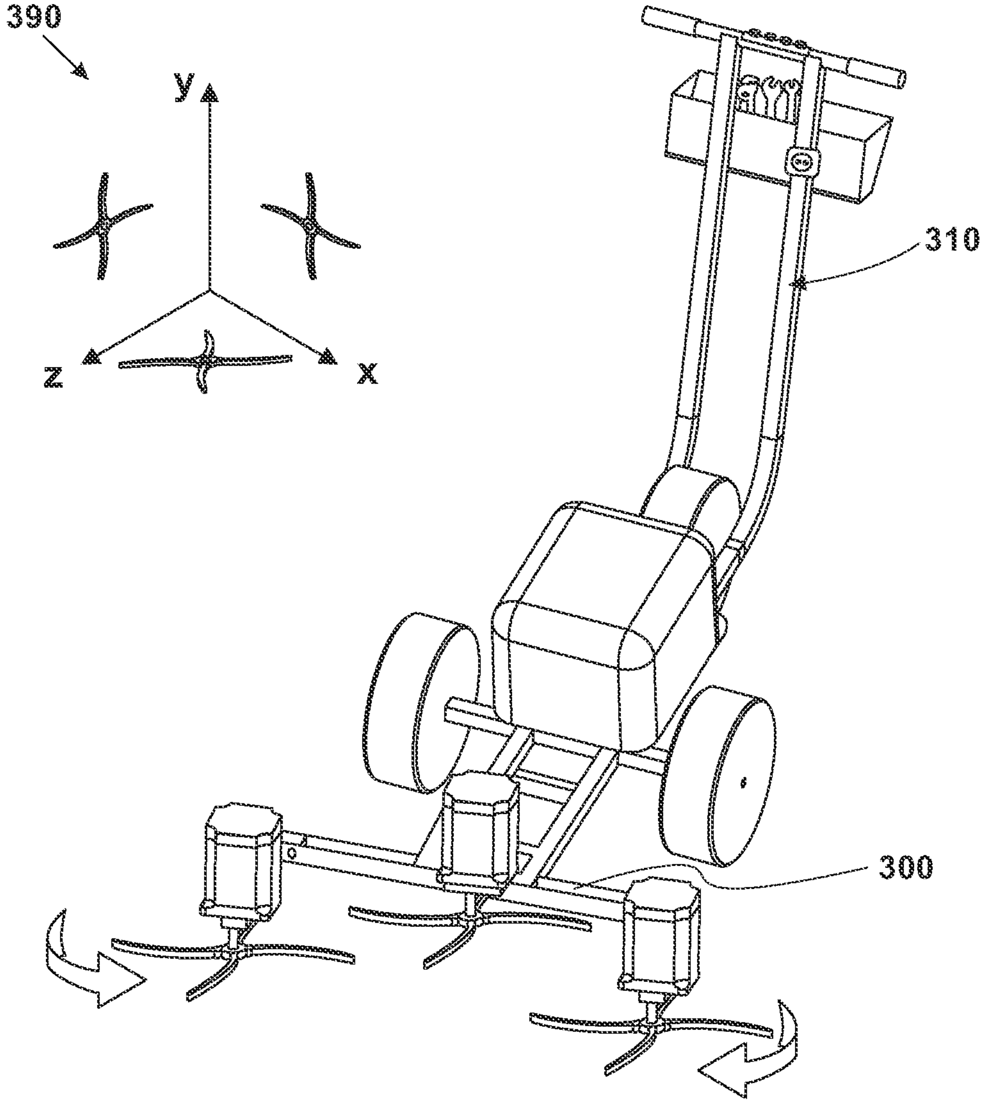
Figure 3B:
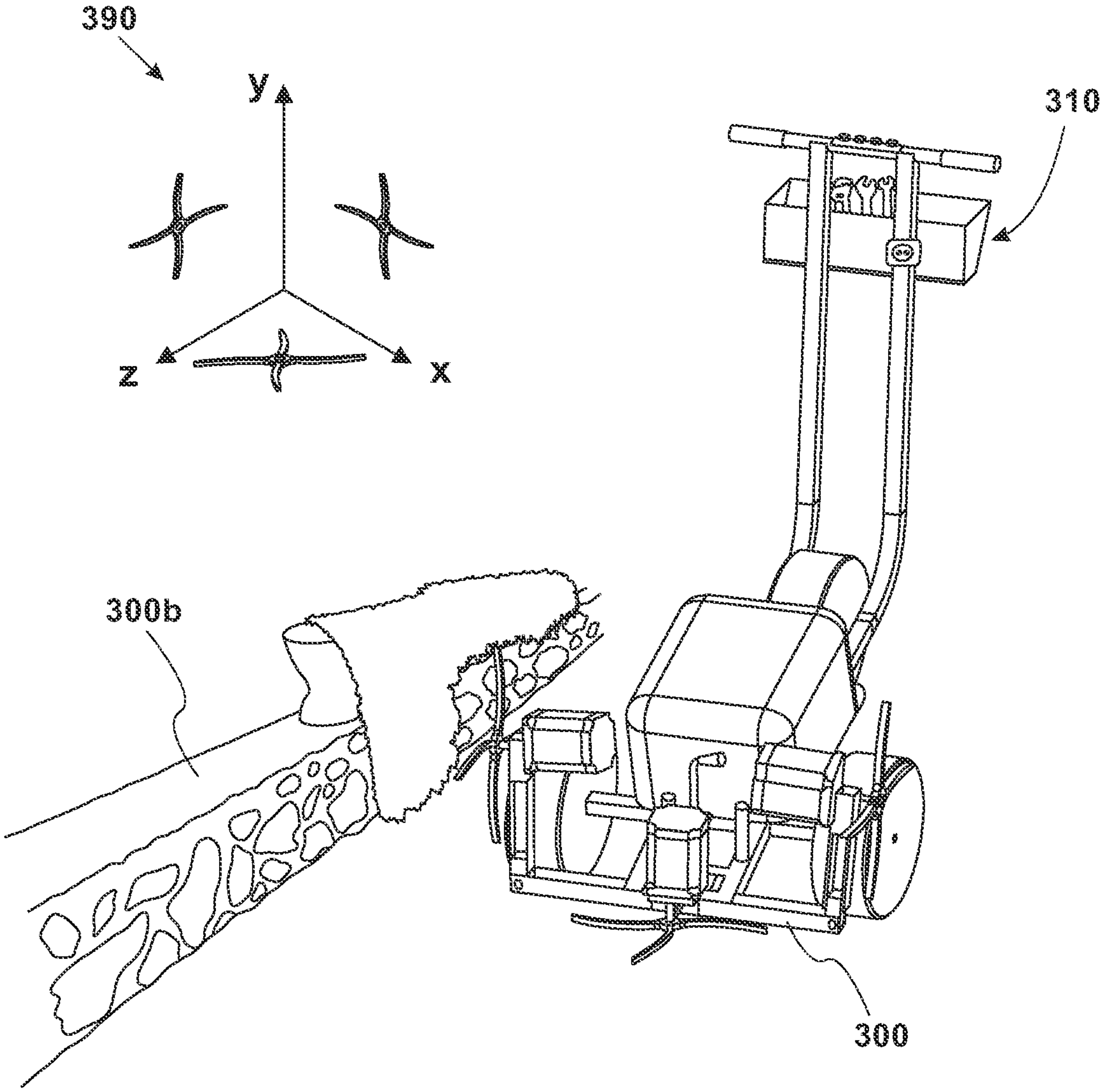
Figure 3C:
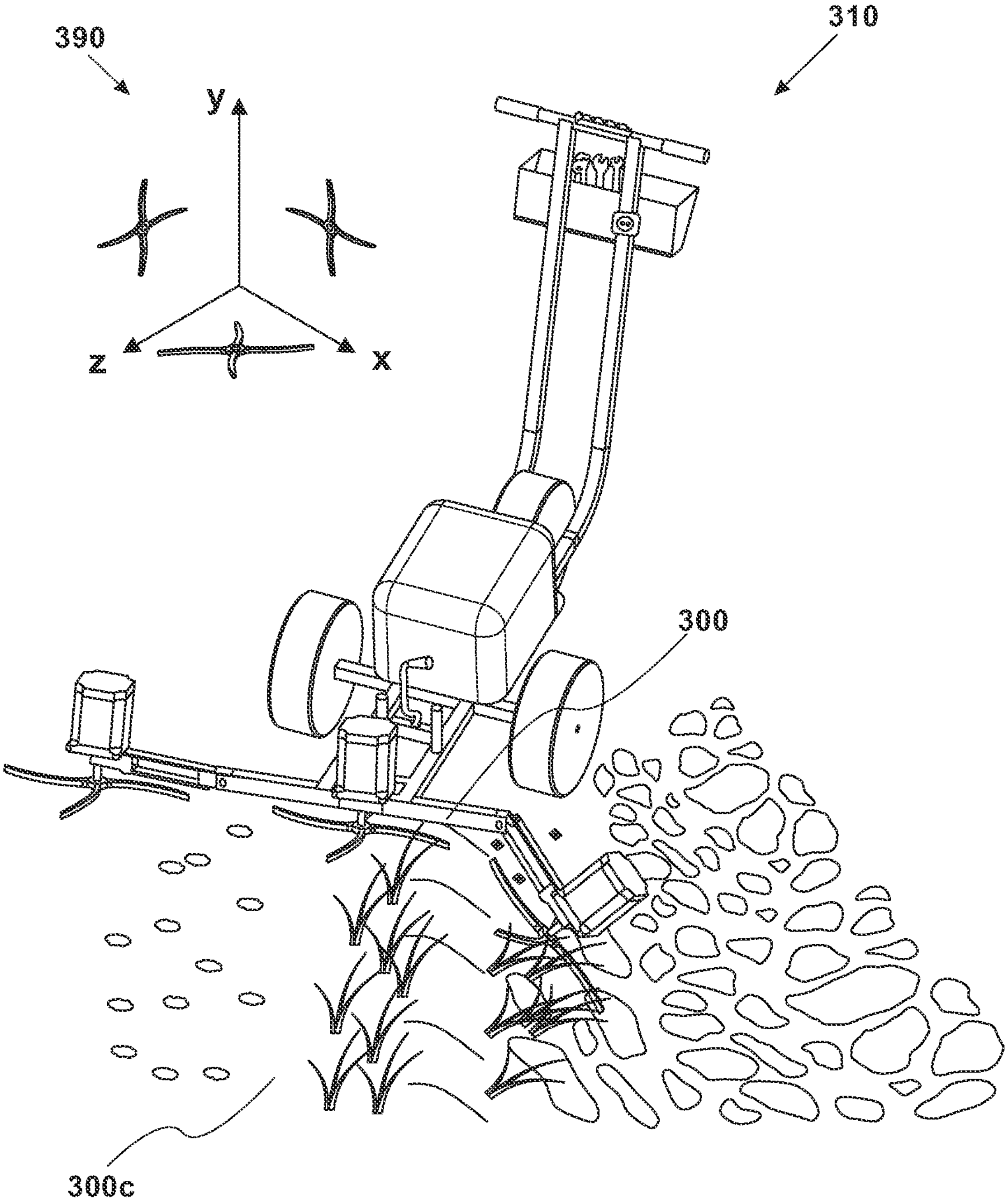
Figure 3D:
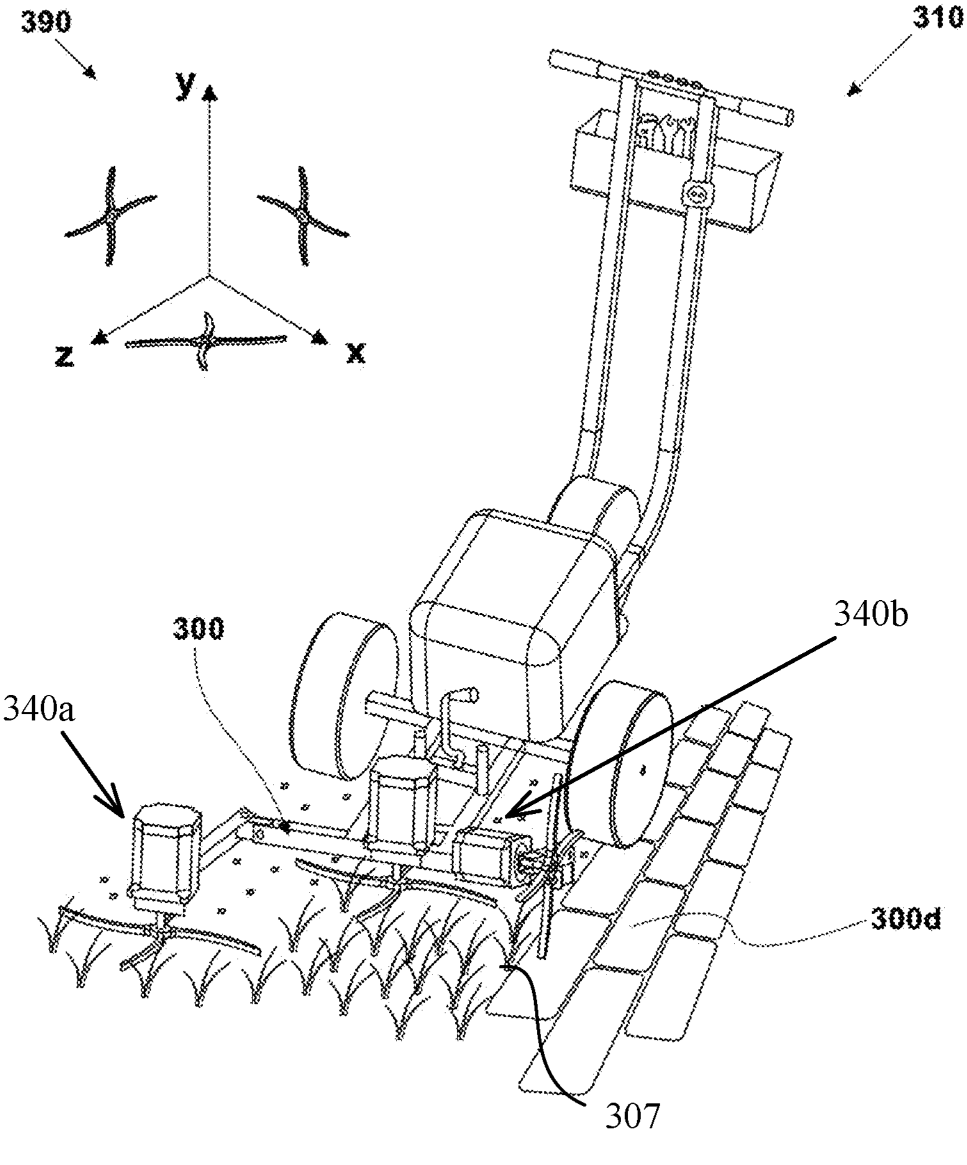

In some exemplary embodiments, Lawn Mower 310 may operate in different environments, such as Environment 300*a* as depicted in FIG. 3A, Environment 300*b* as depicted in FIG. 3B, Environment 300*c* as depicted in FIG. 3C, Environment 300*d* as depicted in FIG. 3D, or the like. Each of Environments 300*a*-300*d* may have different ground conditions, different surfaces, or the like.

As an example, Environment 300*a* may comprise varying sizes of paths (301, 302) on which Lawn Mower 310 operates, with varying widths. Device 300 may be designed to reduce or increase the mowing width by folding or bending one or both of Extension Segments 330*a* and 330*b*, thereby moving Mowing Heads 340*a* and 340*b* along x-axis to fit in any mowing area, with any width. The folding or the bending may be enabled by Joints 325*a* and 325*b*, enabling 3 axes translation movement of each of Extension Segments 330*a* and 330*b*.

As another example, Environment 300*b* may comprise grass climbing on a side of a Fence 304. Device 300 may be designed to fold Extension Segment 330*a* upwards (in y-axis), in a manner folding Mowing Head 340*a* to face the surface parallel to Fence 304.

As yet another example, Environment 300*c* may comprise grass growing on angled Slop 305. Device 300 may be designed to fold Extension Segment 340*a* downwards (in y-axis), in a manner folding Mowing Head 340*a* to face the surface parallel to Slope 305.

As yet another example, Environment 300*d* may comprise grass growing both on a side and in a narrow Path 307. Device 300 may be designed to fold Extension Segment 130*b* in z-axis, and folding Extension Segments 130*b* in x-axis to fit the width of Path 307.

Figure 4A:
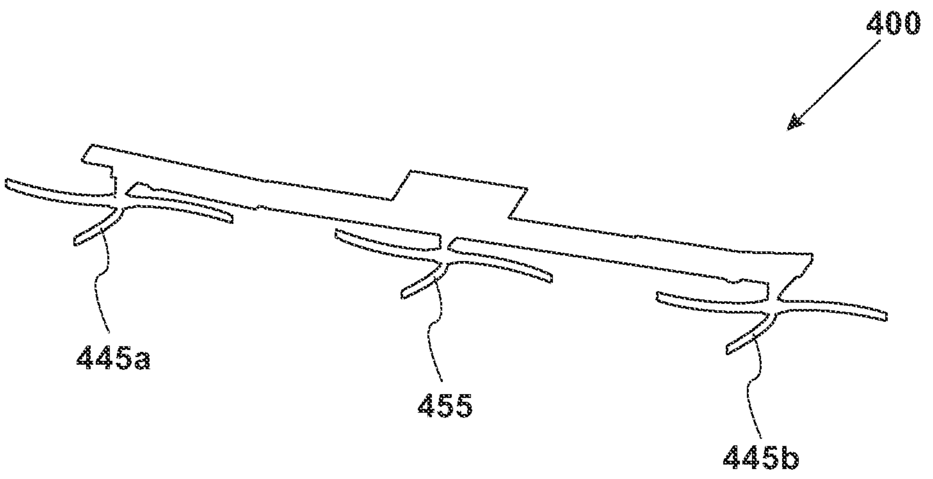
FIGS. 4A-4B show exemplary illustrations of different heads that may be attached to the device, in accordance with some exemplary embodiments of the disclosed subject matter.
Figure 4B:
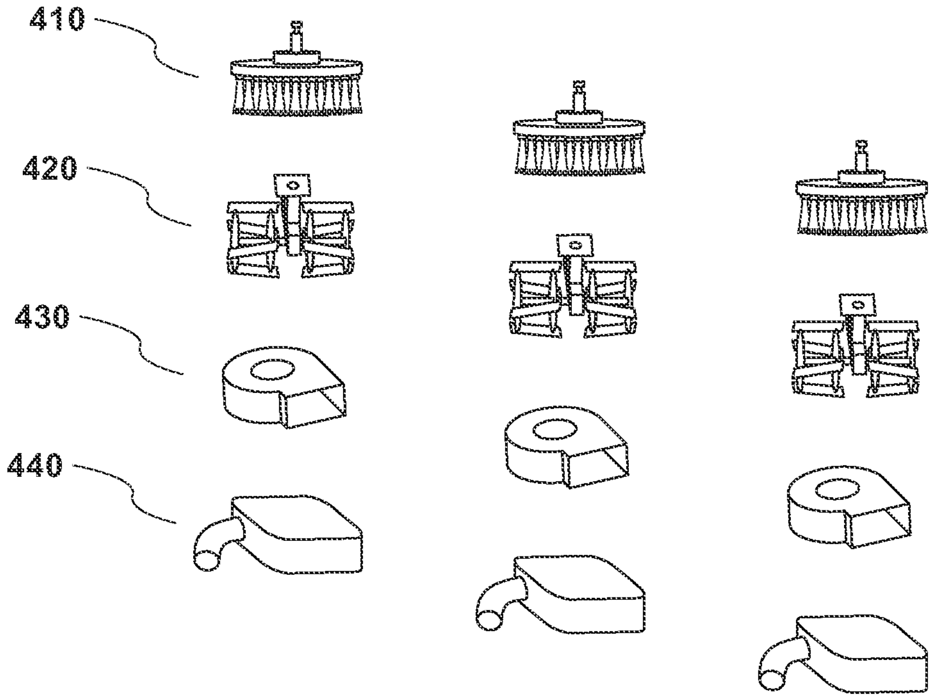

Referring now to FIGS. 4A-4B showing an exemplary illustration of the device, in accordance with some exemplary embodiments of the disclosed subject matter.

In some exemplary embodiments, a plurality of dynamic moveable heads, such as 445*a*, 445*b* and 455 may be configured to be mounted on Variable Bridge 400, such as at the bottom thereof, in a front side thereof, or the like, in a manner reaching the grass at the ground in front of the lawn mower.

In some exemplary embodiments, additional moveable heads may be added to Variable Bridge 400 until covering the entire width of Variable Bridge 400. Each of Moveable Heads 455, 445*a* and 445*b* may be automatically detachable from Variable Bridge 400. The total number of the mowing heads may be determined based on a current width of Variable Bridge 400.

In some exemplary embodiments, Moveable Heads 455, 445*a* and 445*b* may be of different types, may have different functionalities, or the like. As an example, Moveable Heads 455, 4545*a* and 445*b* may be mowing heads. Moveable Heads 455, 4545*a* and 445*b* may have different sizes, different shapes, different number of revolving blades, different type of revolving blades, or the like. Each of Moveable Heads 455, 445*a* and 445*b* may be operated separately, may be controlled independently from other heads, or the like.

Additionally, or alternatively, Moveable Heads 455, 445*a* and 445*b* may be replaced with other attachments or application accessories to diversify the use of the device beyond its primary purpose as a mowing device, such as Cleaning Brushes 410 utilized for cleaning or polishing, Ploughs 420 utilized for tilling ground, Air Blowers 430 for blowing leaves, Vacuum Cleaning Heads 440, or the like.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The flowchart in the figures illustrate the architecture, functionality, and operation of possible implementations of systems, methods, and products according to various embodiments of the present disclosed subject matter. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

What is claimed is:

1. A device configured to be connected to a machine that is movable over a ground surface, the device comprising:

a variable bridge, said variable bridge defining an elongated axis, wherein said variable bridge is movable, in a translation movement, along a vertical axis that is orthogonal to the elongated axis, wherein said variable bridge is further rotatably movable around the vertical axis;

said variable bridge comprising a core segment having two opposing ends and two angularly positionable extension segments, each of said two extension segments is connected to a respective one of the two opposing ends of said core segment by a joint that enables rotational movement; and an angular position of any one extension segment being independent of an angular position of any remaining extension segment;

each of the two extension segments having mounted thereon a moveable head, the moveable head is configured to function at any angular position of the each of the two extension segments;

the moveable head comprising a motor configured to actuate independently from each other motor, wherein each of the two extension segments are selectively positionable:

downward relative to the core segment; or at a same height as the core segment, orthogonal to the core segment, and forward of the core segment relative to a direction of travel of the machine.

2. The device of claim 1, wherein the function that the moveable head is configured to perform at any angular position of each of the two extension segments comprises at least one of: cutting, brushing, ploughing, air blowing, vacuuming or any combination thereof.

3. The device of claim 1, wherein the device is permanently attached to said machine or attachable to and detachable from said machine.

4. The device of claim 1, wherein said joint enables a rotation movement around at least the vertical axis and a depth axis, wherein the depth axis is orthogonal to both the elongated axis and the vertical axis.

5. The device of claim 4, wherein said joint further enables a rotation movement around the elongated axis.

6. The device of claim 1, wherein said joint is at least one of: a universal joint, a ball joint, and a Clevis joint.

7. The device of claim 1, wherein said joint comprises a first joint component and a second joint component, wherein said first joint component enables a rotation movement around the vertical axis, and wherein said second joint component enables a rotation movement around a depth axis, wherein the depth axis is orthogonal to both the elongated axis and the vertical axis.

8. The device of claim 1, wherein said variable bridge is configured to modify a relative distance between two moveable heads, each mounted on one of the two extension segments, thereby reducing or increasing a distance between effective action areas defined by each moveable head of said two moveable heads.

9. The device of claim 8, wherein said variable bridge is further configured to be extended and diminished telescopically to control a width thereof, thereby modifying the relative distance between said two moveable heads.

10. The device of claim 9, further comprises:

a plurality of dynamically mounted moveable heads configured to be mounted on said variable bridge, covering the entire width of said variable bridge, wherein a number of the plurality of dynamically mounted moveable heads is determined based on a current width of said variable bridge; wherein each dynamic moveable head is detachable from said variable bridge.

11. The device of claim 1, wherein each extension segment is movable in a rotational movement in 3 axes, to enable said moveable head mounted on said extension se went to be selectively positioned in a plurality of different functioning positions and orientations.

12. The device of claim 11, wherein each extension segment is capable of performing a rolling movement around its axis, enabling said moveable head to be angled upwards.

13. The device of claim 1, wherein said moveable heads is two moveable heads, and the two moveable heads differentiate in at least one of a type of the moveable head; a size of the moveable head; a shape of the moveable head; and the action performed by the moveable head.

14. The device of claim 1, wherein the device is configured to be controlled by a control unit, said control unit is configured to control a width and movement of said variable bridge, said control unit is further configured to control movement of two moveable heads mounted on each of the two extension segments and the distance therebetween.

15. The device of claim 14, wherein said control unit is configured to:

obtain sensor readings from one or more sensors monitoring an area in which said machine operates; and automatically modify parameters of said variable bridge based on the sensor readings.

16. The device of claim 15, wherein the parameters comprise at least one of;

a height of said variable bridge from the ground surface;

a width of said variable bridge;

a direction of movement of said variable bridge;

a speed of movement of said variable bridge;

a number of activated moveable heads mounted on said variable bridge;

a type of each activated moveable head mounted on said variable bridge;

a size and shape of each activated moveable head mounted on said variable bridge; and movement parameters of each activated moveable head.

17. The device of claim 1, further comprising:

a lifting/lowering mechanism configured to automatically control a height of said variable bridge based on features of the ground surface.

18. The device of claim 1, wherein the machine is a lawn mower;

wherein said moveable heads mounted on each of the two extension segments is a mowing head, each mowing head includes one or more revolving blades that are configured to rotate around an axis that is orthogonal to the elongated axis; and wherein one mowing heads are differentiates from another mowing head in at least one of: a number of said one or more revolving blades; and a type of said one or more revolving blades.

19. The device of claim 1, wherein said machine is an agricultural machine; wherein said moveable head is selected from a group consisting of: a mowing head; a brush; a plough head; a vacuum cleaning head; and a tilting head.

20. The device of claim 1, wherein said motor is configured to provide selectively variable speeds to a corresponding moveable head independently from each other motor, thereby enabling different speeds to each moveable head.

* * * * *